Patented Sept. 15, 1942

2,295,660

UNITED STATES PATENT OFFICE 2,295,660

METHOD OF IMPROVING THE HEAT STABILITY OF POLYVINYL CHLORIDE ARTICLES

Emil Hubert, Dessau-Ziebigk, Herbert Rein, Leipzig, and Karl Rössler, Berlin-Karlshorst, Germany; vested in the Alien Property Custodian No Drawing. Application July 6, 1939, Serial No. 283,048. In Germany July 6, 1938

1 Claim. (Cl. 8—115.5)

This invention relates to a method of improving the thermal stability of polyvinyl chloride.

Polyvinyl chloride containing 56 per cent of chlorine and produced by polymerization of monomeric vinyl chloride has, like the mixed polymerizates which contain polyvinyl chloride, a relatively low softening point. Shaped articles made of such polyvinyl chloride and its mixed polymerizates are, therefore, of only limited utility for various technical purposes and especially for the textile industry.

It is therefor an object of the invention to provide a process for improving the thermal stability of shaped articles consisting of or comprising polyvinyl chloride.

Further objects will become apparent from the detailed description following hereinafter.

The process consists in a subsequent treatment of the shaped articles with gaseous halogen or with halogen dissolved in water or another indifferent solvent. For example, threads, loose fibers, fabrics, films, bands, hose pipes or rods of such material may be subjected to the after-treatment with good result. The products obtained have a considerably raised softening point, so that they are suitable for many purposes for which they were unsuitable previously.

Even articles made of polyvinyl chloride, after-chlorinated in solution as described in U. S. Patent No. 1,982,765 may be improved in their thermal stability if the articles are after-treated in the manner indicated above with gaseous or dissolved halogen.

The following examples illustrate the invention:

Example 1

Threads of polyvinyl chloride having 56 per cent of chlorine which begin to shrink at 70° C. are treated for 1–2 days at 40–50° C. with bromine water of 1 per cent strength. After separating the excess of bromine and drying, there is obtained a thread which begins to shrink at a temperature between 85 and 90° C., so that its stability to heat is better than that of a thread of after-chlorinated polyvinyl chloride.

Example 2

A thread of polyvinyl chloride having 56 per cent of chlorine is treated for 24 hours with moist chlorine gas at room temperature. There is obtained a thread which first begins to shrink at a temperature above 95° C., whereas the untreated polyvinyl chloride threads begin to shrink at a temperature of 70° C.

Example 3

Threads of a mixed polymerizate from vinyl chloride and vinyl acetate (85:15) which in untreated condition softens at about 60° C. are exposed for 72–96 hours to an atmosphere of chlorine. After this treatment the softening point is about 80° C. and when the thread is heated to this temperature it shrinks considerably less than it did before the treatment with chlorine.

Example 4

A fabric consisting of the threads specified in Example 3 is treated under tension for 24–48 hours at 40–50° C. with gaseous chlorine. The softening point is thereby raised to about 80° C.

Example 5

An after-chlorinated polyvinyl chloride spun to thread and containing about 62 per cent of chlorine and having a softening point of 82° C. is treated with bromine water of 1 per cent strength at 40–50° C. After 12–24 hours the excess of bromine is removed, whereupon the thread is found to have a softening point of about 95° C.

Example 6

Threads obtained as described in Example 5 and having a softening point of 82° C. are treated for 12–24 hours at 50–60° C. with moist gaseous chlorine. The softening point of the thread is raised to 95–100° C.

We claim:

A method of raising the softening point of artificial threads spun from polyvinyl chloride containing 56% of chlorine which consists in subjecting said threads at room temperature to the action of an atmosphere of moist gaseous chlorine for 24 hours to thereby raise the temperature at which the threads begin to shrink from 70° C. to 95° C.

EMIL HUBERT.
HERBERT REIN.
KARL RÖSSLER.